US009423797B2

United States Patent
Lee et al.

(10) Patent No.: US 9,423,797 B2
(45) Date of Patent: Aug. 23, 2016

(54) ROBOT CLEANER AND REMOTE MONITORING SYSTEM AND METHOD OF THE SAME

(75) Inventors: Seongsoo Lee, Changwon (KR); Dongki Noh, Changwon (KR); Chulmo Sung, Changwon (KR); Seungmin Baek, Changwon (KR); Jeongsuk Yoon, Changwon (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 13/444,038

(22) Filed: Apr. 11, 2012

(65) Prior Publication Data

US 2012/0271502 A1   Oct. 25, 2012

(30) Foreign Application Priority Data

Apr. 19, 2011   (KR) ........................ 10-2011-0036431

(51) Int. Cl.
*G01C 22/00*   (2006.01)
*G05D 1/00*   (2006.01)
*G05D 1/02*   (2006.01)

(52) U.S. Cl.
CPC .......... *G05D 1/0274* (2013.01); *G05D 1/0246* (2013.01); *A47L 2201/00* (2013.01); *A47L 2201/04* (2013.01); *G05D 1/0227* (2013.01); *G05D 1/0238* (2013.01); *G05D 1/0242* (2013.01); *G05D 1/0255* (2013.01); *G05D 1/0272* (2013.01); *G05D 2201/0203* (2013.01)

(58) Field of Classification Search
CPC .................. G05D 1/0274; A47L 2201/04
USPC ............. 701/2, 23, 26, 28, 50; 15/21.1, 319;
320/104, 107; 700/245, 253, 259, 258;
356/3.14, 4.01, 4.03; 382/104, 154;
345/419
See application file for complete search history.

(56) References Cited

U.S. PATENT DOCUMENTS

| 5,040,116 | A | * | 8/1991 | Evans et al. ..................... 701/28 |
| 5,440,216 | A | * | 8/1995 | Kim ............................... 318/587 |
| 5,475,600 | A | * | 12/1995 | Kim ............................... 701/23 |
| 7,359,766 | B2 | * | 4/2008 | Jeon et al. ..................... 700/245 |
| 7,589,825 | B2 | * | 9/2009 | Orchard et al. ............. 356/4.03 |
| 7,805,220 | B2 | * | 9/2010 | Taylor .................. G05D 1/0219 318/568.12 |
| 2005/0166354 | A1 | * | 8/2005 | Uehigashi ....................... 15/319 |
| 2006/0074532 | A1 | | 4/2006 | Hong ............................... 701/28 |
| 2006/0238374 | A1 | * | 10/2006 | Saeki ..................... G08C 23/04 340/13.24 |

(Continued)

FOREIGN PATENT DOCUMENTS

WO   WO 01/37060 A1   5/2001
WO   WO 2008/120961 A2   10/2008

OTHER PUBLICATIONS

European Search Report dated Jun. 18, 2013 issued in Application No. 12 16 1783.

*Primary Examiner* — Tuan C. To
*Assistant Examiner* — Isaac Smith
(74) *Attorney, Agent, or Firm* — KED & Associates LLP

(57) ABSTRACT

Disclosed are a robot cleaner and a method for controlling the same. Firstly, an obstacle may be detected by using a light pattern sensor, and a user's inconvenience due to irradiation of a light pattern may be solved. Secondly, an obstacle may be precisely detected in a three dimensional manner by using the light pattern sensor. This may allow precise creation of a cleaning map. Thirdly, a user's eyes may be prevented from being continuously exposed to a light source. This may enhance the user's convenience.

17 Claims, 4 Drawing Sheets

(56) References Cited

U.S. PATENT DOCUMENTS

| | | | |
|---|---|---|---|
| 2007/0192910 A1* | 8/2007 | Vu et al. ............... | 901/17 |
| 2008/0086236 A1* | 4/2008 | Saito et al. ............ | 700/245 |
| 2008/0154457 A1* | 6/2008 | Yu et al. ............... | 701/26 |
| 2010/0268385 A1* | 10/2010 | Rew et al. ............. | 700/259 |
| 2010/0324731 A1* | 12/2010 | Letsky ............... | A01D 34/008 700/245 |
| 2011/0311130 A1* | 12/2011 | Ichimori ............. | G01C 11/06 382/154 |

* cited by examiner

ROBOT CLEANER AND REMOTE MONITORING SYSTEM AND METHOD OF THE SAME

CROSS-REFERENCE TO RELATED APPLICATION

This application claims the benefit of Korean Patent Application No. 10-2011-0036431, filed on Apr. 19, 2011, which is hereby incorporated by reference for all purposes as if fully set forth herein.

BACKGROUND OF THE DISCLOSURE

1. Field of the Disclosure

The present disclosure relates to a robot cleaner and a method for controlling the same, and particularly, to a robot cleaner capable of detecting an obstacle based on a light pattern, and a method for controlling the same.

2. Background of the Disclosure

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials while autonomously moving on a predetermined region. This robot cleaner is provided with a chargeable battery, and is provided with an obstacle sensor for avoiding an obstacle while moving. In case of using a sensor having a light source as the obstacle sensor, the light source may be continuously exposed to a user's eyes.

SUMMARY OF THE DISCLOSURE

Therefore, an aspect of the detailed description is to provide a robot cleaner capable of protecting a user from a light pattern, and a method for controlling the same.

Another aspect of the detailed description is to provide a robot cleaner capable of irradiating a light pattern or stopping driving of a light pattern sensor according to a position change of the light pattern sensor, and a method for controlling the same.

To achieve these and other advantages and in accordance with the purpose of this specification, as embodied and broadly described herein, there is provided a robot cleaner, the robot cleaner comprising: an obstacle detection unit having a light pattern sensor, and configured to detect an obstacle by using a light pattern and to output obstacle information; a position recognition unit having one or more sensors, and configured to recognize a position of the robot cleaner and to output position information; and a controller configured to control the robot cleaner based on the obstacle information and the position information.

According to another embodiment of the present disclosure, there is provided a robot cleaner, the robot cleaner comprising: an obstacle detection unit having a light pattern sensor, and configured to detect an obstacle by using a light pattern and to output obstacle information; a controller configured to drive the light pattern sensor when a position change of the robot cleaner has occurred, configured to create a cleaning map based on the obstacle information, and configured to control the robot cleaner based on the cleaning map; and a storage unit configured to store the obstacle information and the cleaning map.

The light pattern sensor may include a light source module configured to irradiate a light pattern based on the position information; a camera module configured to capture an image included in a region to which the light pattern has been irradiated; and an image processing module configured to detect an obstacle by processing the image.

To achieve these and other advantages and in accordance with the purpose of this specification, as embodied and broadly described herein, there is also provided a method for controlling a robot cleaner, the method comprising: detecting a position change of a robot cleaner; irradiating a light pattern upon detection of the position change; capturing an image included in a region to which the light pattern has been irradiated; and detecting an obstacle from the image.

The present disclosure may have the following advantages.

Firstly, an obstacle may be detected by using the light pattern sensor, and a user's inconvenience due to irradiation of a light pattern may be solved.

Secondly, an obstacle may be precisely detected in a three dimensional manner by using the light pattern sensor. This may allow precise creation of a cleaning map.

Thirdly, the robot cleaner may perform a cleaning operation or may move based on a cleaning map. This may enhance cleaning efficiency and stability of a system.

Fourthly, a user's eyes may be prevented from being continuously exposed to a light source. This may protect the user's eyes and enhance the user's convenience.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
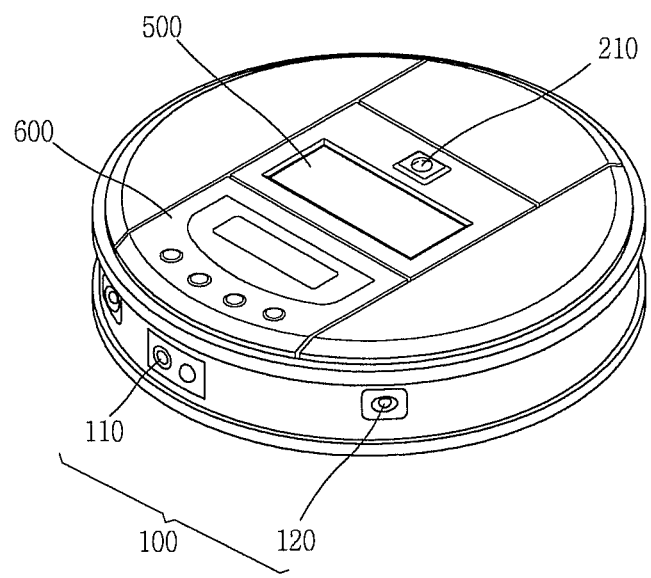
FIG. 1 is a perspective view showing the appearance of a robot cleaner according to one embodiment of the present disclosure.
Figure 2:
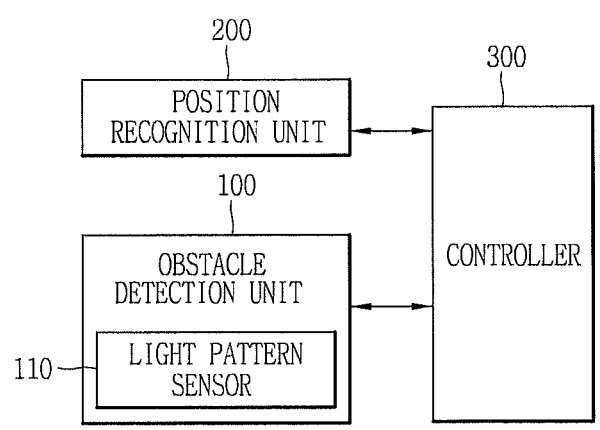
FIGS. 2 and 3 are block diagrams schematically showing a configuration of a robot cleaner according to the present disclosure.

Referring to FIGS. 1 and 2, a robot cleaner according to one embodiment of the present disclosure comprises an obstacle detection unit 100, a position recognition unit 200, and a controller 300. The obstacle detection unit 100 includes a light pattern sensor 110, and is configured to detect an obstacle by using a light pattern and to output obstacle information. The position recognition unit 200 is provided with one or more sensors, and is configured to recognize the position of the robot cleaner and to output position information. And, the controller 300 is configured to control the robot cleaner based on the obstacle information or based on both of the obstacle information and the position information.

The obstacle detection unit 100 is configured to detect an obstacle near the robot cleaner while moving in a cleaning region, or while performing a cleaning operation. The obstacle detection unit 100 is configured to output, to the controller 300, information on an obstacle, i.e., information on whether an obstacle exists or not or information on the position, the size, etc. of the obstacle. The obstacle detection unit 100 may further include an infrared ray sensor, an ultrasonic sensor, a radio frequency (RF) sensor, a bumper, a position sensitive device (PSD) sensor, etc. as well we the light pattern sensor 110. The controller 300 may be configured to create a cleaning map based on obstacle information outputted from the obstacle detection unit 100.

The position recognition unit 200 is configured to recognize the current position of the robot cleaner within a cleaning region, and to detect a position change. As the position recognition unit 200, may be used one or more sensors such as an acceleration sensor, an encoder and a gyro sensor. The acceleration sensor is configured to recognize each speed and each position of the robot cleaner which is moving. The encoder is connected to a wheel motor for driving wheels of the robot cleaner, thereby detecting a moving distance and a speed of the robot cleaner. The gyro sensor is configured to detect a rotation speed of the robot cleaner. The controller 300 may create a cleaning map based on the position of the robot cleaner, together with obstacle information. And, the controller 300 may correct the cleaning map created based on the obstacle information, based on position information of the robot cleaner. Since the light pattern sensor is fixed to a body of the robot cleaner, the controller 300 may recognize a position change of the light pattern sensor by a position change of the robot cleaner.

A camera 210 of FIG. 1 may be used as a position recognition unit. The camera 210 is installed toward the upper or front side to capture the periphery of the robot cleaner. When the robot cleaner is provided with a plurality of cameras, the cameras may be formed on the upper or side part of the robot cleaner at a constant interval therebetween, or at a constant angle therebetween. The robot cleaner may further include a lens connected to a camera and focusing the camera on a subject, a camera controller configured to control the camera, and a lens controller configured to control the lens. As the lens, preferably used is a lens having a wide view angle so that all the peripheral regions (e.g., all the regions on the ceiling) may be captured at a predetermined position, e.g., when the camera is toward the upper side. For instance, the lens is implemented as a lens having a view angle more than a predetermined angle, 160°.

The robot cleaner may further include a storage unit 400 configured to store therein a light pattern to be irradiated and an image captured by the light pattern having been irradiated. The storage unit 400 may further store therein information on an image captured by the camera 210, position information, a cleaning region, a cleaning map, etc. As the storage unit 400, a non-volatile memory is mainly used. The non-volatile memory (NVM, NVRAM) indicates a storage apparatus capable of continuously maintaining stored information even in a state of no power supply. The non-volatile memory is implemented as ROM, a flash memory, a magnetic computer memory device (e.g., a hard disc, a diskette drive and a magnetic tape), an optical disc drive, magnetic RAM, PRAM, etc. The light pattern sensor 110 is configured to detect an obstacle by comparing a light pattern before irradiation (light pattern stored in the storage unit) with a light pattern of the image after irradiation. Then, the light pattern sensor 110 is configured to create obstacle information, and to output the obstacle information to the controller.

Figure 4:
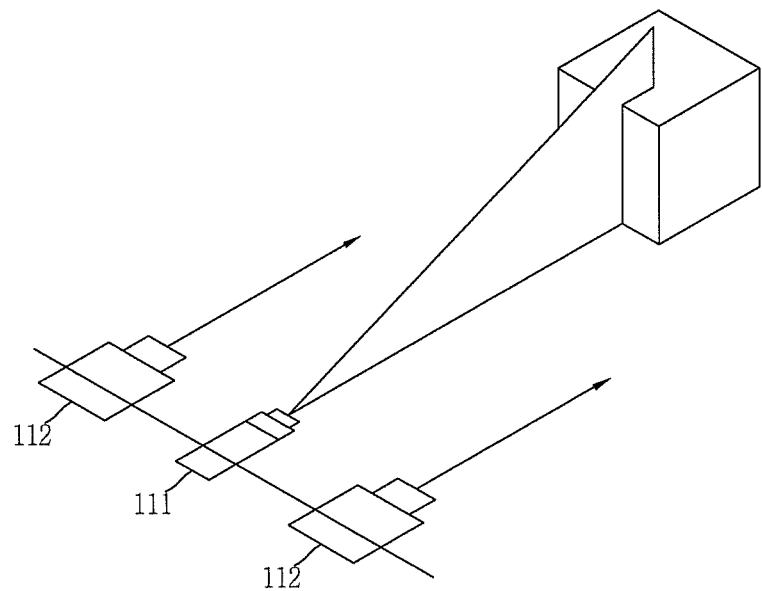
FIG. 4 is a view for explaining an operation to detect an obstacle by using a light pattern sensor.

Referring to FIG. 4, the light pattern sensor 110 includes a light source module 111 configured to irradiate a light pattern according to the position information, and a camera module 112 configured to capture an image included in a region to which the light pattern has been irradiated. The light source module 111 includes a laser diode (LD), a light emitting diode (LED), etc. The light pattern sensor 110 may further include an additional lighting as well as the light source module 111. The camera module may be provided at the light pattern sensor in one in number as shown in FIG. 1, or in two or more as shown in FIG. 4. The camera module is implemented as a structured light camera, and the light pattern sensor includes a laser vision sensor.

The light pattern sensor 110 includes an image processing module configured to detect an obstacle by processing the image. The image processing module may be provided at the controller. The image processing module is configured to detect an obstacle by processing an image captured by the camera module. As an example, the image processing module may detect an obstacle from an image by using a shape, an area, a change, etc. of a light pattern having been irradiated to a region. Alternatively, the image processing module may detect an obstacle by extracting a pattern of which axis is toward a predetermined direction (e.g., 'X' direction), and then by converting the axis direction of the extracted pattern to another direction. Still alternatively, the image processing module may extract only a vertical component from an image captured by one camera module, and may extract only a horizontal component from an image captured by another camera module. Then, the image processing module may create a three-dimensional (3D) pattern, and detect an obstacle based on the 3D pattern. Then, the image processing module may output, to the controller, obstacle information such as the size, the shape, etc. of an obstacle. The light pattern sensor may further include a filter connected to a front end of the light source module, and configured to pass only a predetermined frequency of a light pattern irradiated from the light source module.

The controller 300 receives obstacle information from the light pattern sensor 110, and performs a cleaning operation based on the obstacle information. The controller 300 drives the light pattern sensor 110, and controls driving of the light source module and the camera module of the light pattern sensor 110. Especially, the controller 300 drives the light pattern sensor based on the position information received from the position recognition unit 300. As an example, the controller 300 controls an intensity, a form, a duty ratio, etc. of a light pattern to be irradiated from the light source module. And, the controller 300 controls a position, an angle, a capturing frequency (the number of times of capturing), etc. of the camera module. The controller 300 detects a position change of the light pattern sensor based on the position information received from the position recognition unit 300. If there is no position change of the light pattern sensor as a detection result, the controller 300 does not drive the light source module. On the other hand, if there is a position change of the light pattern sensor as a detection result, the controller 300 drives the light source module to irradiate a light pattern.

Figure 3:
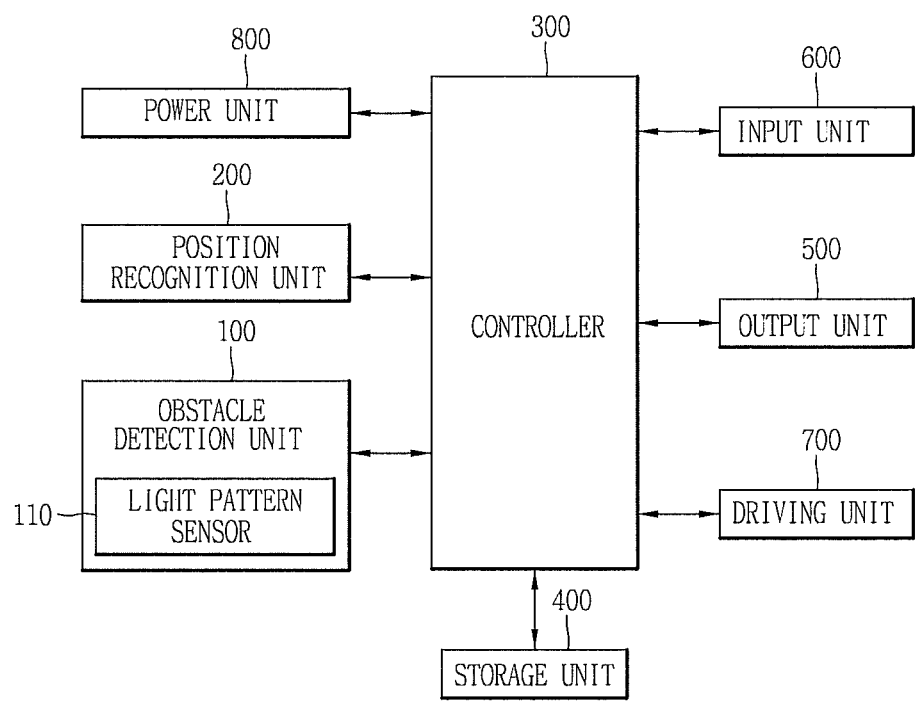

Referring to FIG. 3, the robot cleaner further comprises an output unit 500, an input unit 600, a driving unit 700, and a power unit 800.

The output unit 500 is configured to display, on a screen, obstacle information, position information, a cleaning region, a cleaning map, etc., as well as the light pattern, and the image captured by the camera module. And, the output unit 500 may further display state information, such as a current state of each unit of the robot cleaner, and a current cleaning state. The output unit 500 may be implemented as one of a light emitting diode (LED), a liquid crystal display (LCD), a plasma display panel (PDP) and an organic light emitting diode (OLED).

A user directly inputs a control command to the robot cleaner through the input unit 600. Alternatively, the user may input, through the input unit, a command instructing output of one or more information stored in the storage unit 400. The input unit 600 is provided with an OK button, a set button, etc. The OK button is used to input a command for certifying sensing information, obstacle information, position information, a cleaning region and a cleaning map. The set button is used to input a command for setting the information. The input unit may be provided with a reset button for inputting a command for resetting the information, a deletion button, a cleaning start button, a stop button, etc. Each of the input unit 600 and the output unit 500 may be implemented in the form of a touch screen for implementation of input and output.

The driving unit 700 is connected to a plurality of wheels including a plurality of main wheels and one or more auxiliary wheels. And, the driving unit 700 is provided with a wheel motor for rotating the wheels, and moves the robot cleaner by driving the wheel motor.

The power unit 800 is provided with chargeable power supply means to supply power into the robot cleaner. The power unit 800 supplies an operation power required when the robot cleaner moves or performs a cleaning operation. When the remaining amount of the power unit 800 is deficient, the robot cleaner moves to a charging base to supply a charging current to the power unit 800.

The robot cleaner may further comprise a cleaning unit (not shown). The cleaning unit is provided with a suction motor for sucking the air and a means for collecting dust, and is configured to suck peripheral dust or foreign materials.

Figure 5:
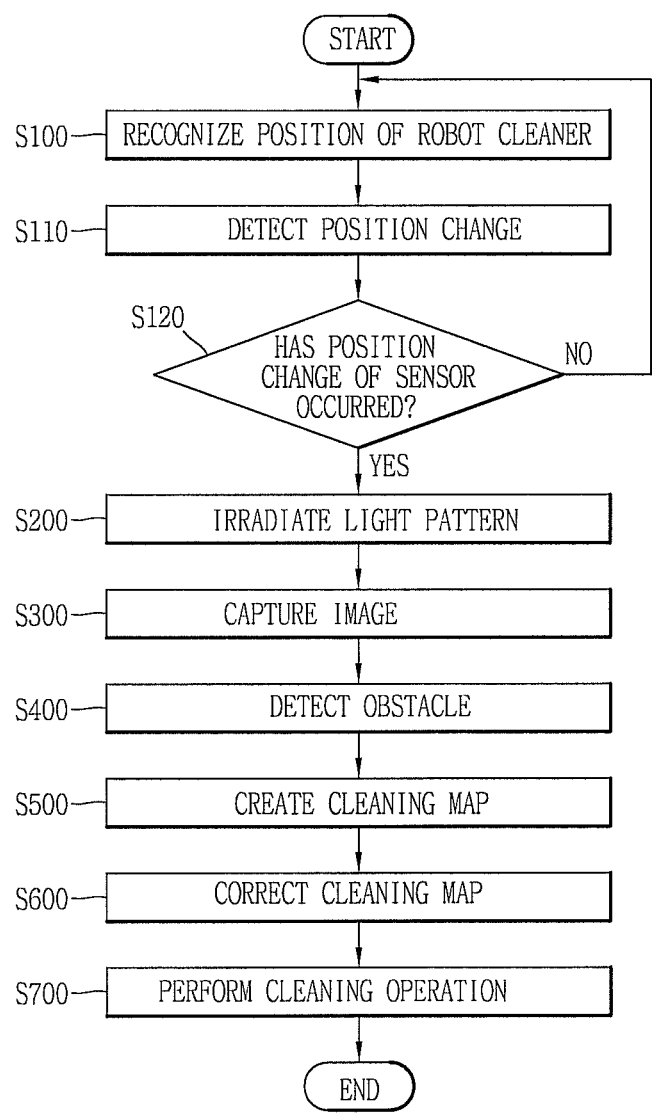
FIG. 5 is a flowchart schematically showing a method for controlling a robot cleaner according to one embodiment of the present disclosure.

Referring to FIG. 5, a method for controlling a robot cleaner according to one embodiment of the present disclosure comprises detecting a position change of the robot cleaner (S110), irradiating a light pattern upon detection of the position change (S200), capturing an image included in a region to which the light pattern has been irradiated (S300), and detecting an obstacle from the image (S400). Detailed explanations about the apparatus will be understood with reference to FIGS. 1 to 4.

The robot cleaner comprises an obstacle detection unit having a light pattern sensor, and configured to detect an obstacle by using a light pattern and output obstacle information, a position recognition unit, and a controller configured to control the robot cleaner. The robot cleaner recognizes its position by using each type of sensors such as an upper camera and an encoder (S100). The robot cleaner detects a position change, a speed change, a direction change, etc. based on position information (S110). Once the position of the robot cleaner changes, the position of a light pattern sensor provided at a body of the robot cleaner also changes. If the position of the light pattern sensor changes, the robot cleaner periodically irradiates a light pattern. On the other hand, if the position of the light pattern sensor does not change, the robot cleaner stops driving the light pattern to sensor (S200).

The method may further comprise creating a cleaning map based on an obstacle (S500). The robot cleaner captures a light pattern irradiated by using the light pattern sensor (S300), and then creates a three-dimensional pattern. The robot cleaner creates obstacle information such as information on the size, the shape, etc. of an obstacle, by detecting an obstacle based on the light pattern (S400). The robot cleaner creates a cleaning map based on the obstacle information, and performs a cleaning operation or moves (S700). The robot cleaner may create a cleaning map based on position information recognized by the position recognition unit, or may correct the created cleaning map based on the obstacle information (S600).

The present disclosure may have the following advantages.

Firstly, an obstacle may be detected by using the light pattern sensor, and a user's inconvenience due to irradiation of a light pattern may be solved.

Secondly, an obstacle may be precisely detected in a three dimensional manner by using the light pattern sensor. This may allow precise creation of a cleaning map.

Thirdly, a user's eyes may be prevented from being continuously exposed to a light source. This may protect the user's eyes and enhance the user's convenience.

What is claimed is:

1. A robot cleaner, comprising:
an input device configured to receive a control command with respect to the robot cleaner;
a position recognition device having one or more sensors, and configured to recognize a position of the robot cleaner and to output position info illation;
an obstacle detection device having a light pattern sensor, and configured to detect an obstacle by using the light pattern sensor and to output obstacle information; and
a storage unit to store a light pattern including a vertical component and a horizontal component; and
a controller configured to control the robot cleaner based on the obstacle information and the position information,
wherein the light pattern sensor is configured to be disposed at a side of the robot cleaner and to irradiate the stored light pattern based on the position information, and the light pattern sensor to detect an obstacle based on the vertical component and the horizontal component of the light pattern corresponding to the obstacle,
wherein the light pattern sensor includes a light source module configured to irradiate a light pattern based on the position information, wherein first and second camera modules are configured to capture first and second images from a region to which the light pattern has been irradiated and an image processing module configured to detect an obstacle by processing the first and second images,
wherein the light pattern sensor includes a filter connected to a front end of the light source module, and the filter is configured to pass only a predetermined frequency of a light pattern irradiated from the light source module,
wherein the controller is configured to start moving or rotating of the robot cleaner by using the obstacle information or the control command,
wherein the controller is configured to detect whether a position of the light pattern sensor is changed or not by using the position recognition device while the robot cleaner is moving or rotating, wherein the controller to perform the following in sequence:
(a) when the position of the light pattern sensor is detected to not have changed, the light pattern sensor to stop irradiating the light pattern,
(b) when the position of the light pattern sensor is detected to have changed by moving of the robot cleaner, the light pattern sensor to irradiate the light pattern periodically, and
(c) when the position of the light pattern sensor is detected to have changed by rotating of the robot cleaner in a same location, the light pattern sensor to irradiate the light pattern periodically,
wherein the controller controls at least one of a form and a duty ratio of the light pattern based on the position information.

2. The robot cleaner of claim 1, wherein the vertical component of the light pattern is extracted from the first image captured by the first camera module and the horizontal component of the light pattern is extracted from the second image captured by the second camera module.

3. The robot cleaner of claim 1, wherein the controller periodically drives a light source module in response to a position change of the light pattern sensor.

4. The robot cleaner of claim 1, wherein the light pattern sensor is configured to detect an obstacle by comparing the light pattern before irradiation with a light pattern included in the first and second images after irradiation.

5. The robot cleaner of claim 4, wherein the controller creates a cleaning map based on the obstacle information.

6. The robot cleaner of claim 5, wherein the controller corrects the cleaning map based on the position information.

7. The robot cleaner of claim 1, wherein the position recognition device includes a camera installed at an upper portion or a front portion of the robot cleaner, wherein the camera is configured to capture an image at a periphery of the robot cleaner and to output image information.

8. The robot cleaner of claim 1, wherein the position recognition device includes at least one of:
an acceleration sensor configured to recognize speed and position as the robot cleaner moves;
an encoder connected to a wheel motor for driving wheels of the robot cleaner, and configured to detect a moving distance and a speed of the robot cleaner; or
a gyro sensor configured to detect a rotation speed of the robot cleaner.

9. A robot cleaner, comprising:
an input device configured to receive a control command with respect to the robot cleaner;
an obstacle detection device having a light pattern sensor, and configured to detect an obstacle using a light pattern and to output obstacle information;
a controller configured to drive the light pattern sensor in response to a position change of the robot cleaner, configured to create a cleaning map based on the obstacle information, and configured to control the robot cleaner based on the cleaning map;
a position recognition device having one or more sensors, and configured to recognize a position of the robot cleaner and to output position information; and
a storage device configured to store the obstacle information, the cleaning map and a predetermined image data related with a light pattern including a vertical component and a horizontal component,
wherein the light pattern sensor is configured to be disposed at a side of the robot cleaner and to irradiate the stored light pattern using the predetermined image data based on the position information to a region, and to detect the obstacle based on the vertical component and the horizontal component of the light pattern corresponding to the obstacle,
wherein the light pattern sensor includes a light source module configured to irradiate a light pattern based on the position information, wherein first and second camera modules are configured to capture first and second images from a region to which the light pattern has been irradiated and an image processing module configured to detect an obstacle by processing the first and second images,
wherein the light pattern sensor includes a filter connected to a front end of the light source module, and the filter is configured to pass only a predetermined frequency of a light pattern irradiated from the light source module,
wherein the controller is configured to start moving or rotating of the robot cleaner by using the obstacle information or the control command,
wherein the controller is configured to detect whether a position of the light pattern sensor is changed or not by using the position recognition device while the robot cleaner is moving or rotating, and
wherein the controller to perform the following in sequence:
(a) when the position of the light pattern sensor is detected to not have changed, the light pattern sensor to stop irradiating the light pattern, and
(b) when the position of the light pattern sensor is detected to have changed by moving of the robot cleaner, the light pattern sensor to irradiate the light pattern periodically, and
(c) when the position of the light pattern sensor is detected to have changed by rotating of the robot cleaner while at a same location, the light pattern sensor to irradiate the light pattern periodically,
wherein the controller controls at least one of a form and a duty ratio of the light pattern based on the position information.

10. The robot cleaner of claim 9, wherein the light pattern sensor includes:
a light source module configured to irradiate the light pattern based on the position information, wherein first and second camera modules are configured to capture in first and second images from the region to which the light pattern has been irradiated; and
an image processing module configured to detect an obstacle by processing the first and second images.

11. The robot cleaner of claim 10, wherein the first and second camera modules are a structured light camera, and the light source module is a laser diode (LD) or a light emitting diode (LED).

12. The robot cleaner of claim 10, wherein the image processing module detects an obstacle based on a shape, an area and a change of the light pattern.

13. The robot cleaner of claim 10, further comprising:
an output device configured to display, on a screen, at least one of the light pattern, the obstacle information, the position information or the cleaning map;
a driving device having a wheel motor for rotating wheels, and configured to move the robot cleaner by driving the wheel motor; and
a power device including a chargeable power supply device configured to supply power to the robot cleaner.

14. A method for controlling a robot cleaner having a light pattern sensor disposed at a side of the robot cleaner for detecting an obstacle using a light pattern, the method comprising:
receiving an obstacle information or a control command;
starting movement or rotation of the robot cleaner by using the obstacle information or the control command;
recognizing, by a position recognition device of the robot cleaner, a position of the robot cleaner and outputting position information;
detecting, by a controller of the robot cleaner, whether a position of the robot cleaner is changed;
detecting, by a controller of the robot cleaner, whether a position of the light pattern sensor is changed; and
determining, by a controller of the robot cleaner, whether the light pattern sensor irradiates the light pattern or does not irradiate the light pattern,
wherein the controller to perform the following in sequence:
(a) when the position of the light pattern sensor is detected to not have changed, the light pattern sensor to stop irradiating the light pattern,
(b) when the position of the light pattern sensor is detected to have changed by moving of the robot cleaner, the light pattern sensor to irradiate the light pattern periodically to a region, and
(c) when the position of the light pattern sensor is detected to have changed by the robot cleaner rotating at a same location, the light pattern sensor to irradiate the light pattern periodically to a region,
wherein the controller controls at least one of a form and a duty ratio of the light pattern based on the position information,
wherein when the light pattern sensor irradiates the light pattern, the method further comprising:
capturing, by first and second camera modules, first and second images included in the region to which the light pattern has been irradiated, wherein the capturing includes capturing the first image using the first camera module and capturing the second image using the second camera module; and
passing, by a filter connected to a front end of a light source module, a predetermined frequency of a light pattern irradiated from the light source module,
detecting, by an obstacle detection device of the robot cleaner, an obstacle based on a vertical component and a horizontal component of the light pattern corresponding to the obstacle.

15. The method of claim 14, further comprising periodically irradiating, by the light pattern sensor, the light pattern when the position change of the light pattern sensor has occurred.

16. The method of claim 14, wherein detecting the obstacle includes extracting, by the controller, the vertical component of the light pattern from the first image captured by the first camera module and extracting, by the controller, the horizontal component of the light pattern from the second image captured by the second camera module.

17. The method of claim 14, further comprising creating, by the controller, a cleaning map based on the obstacle information.

* * * * *